No. 733,575. PATENTED JULY 14, 1903.
F. J. BRIGGS.
SHACKLE.
APPLICATION FILED MAY 16, 1902.
NO MODEL.
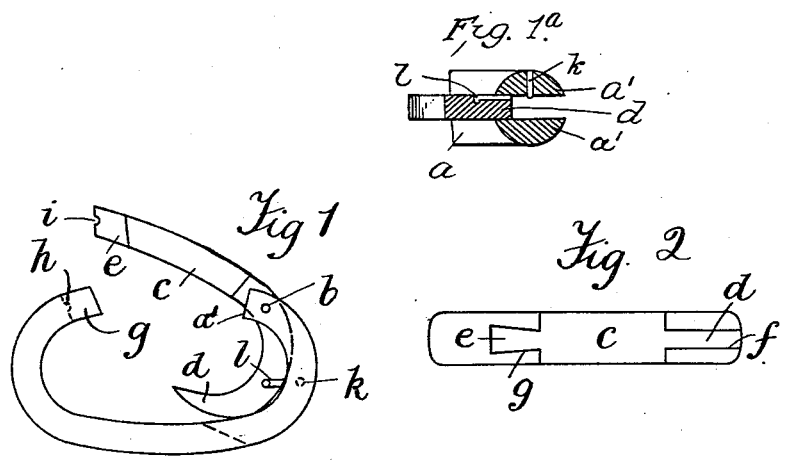
WITNESSES
H. M. Kuehne
J. M. Dowling
INVENTOR
Frederick John Briggs
By Richards
ATTORNEYS

UNITED STATES PATENT OFFICE.

FREDERICK JOHN BRIGGS, OF HOUNSLOW, ENGLAND.

SHACKLE.

SPECIFICATION forming part of Letters Patent No. 733,575, dated July 14, 1903.

Application filed May 16, 1902. Serial No. 107,680. (No model.)

*To all whom it may concern:*

Be it known that I, FREDERICK JOHN BRIGGS, tobacconist, a subject of the King of England, residing at 162 High street, Hounslow, in the county of Middlesex, England, have invented a certain new and useful Shackle, of which the following is a full, clear, and exact description, and for which I have applied for Letters Patent in Great Britain, dated February 18, 1902.

This invention relates to snap-links or shackles used in chains and for other purposes whereby a new link can be inserted to replace a damaged one and whereby also anything held by the link can be readily released.

The invention refers to that class of shackle in which a movable side piece or complement is pivoted to the body of the shackle; and it consists in certain combinations of parts whereby a neat and efficient joint is made and a positive locking device provided.

The invention is illustrated upon the accompanying drawings, upon which—

Figure 1 shows a plan of the link or shackle in the open position. Fig. 1ª is a sectional view, on an enlarged scale, of the locking device shown in Fig. 1. Fig. 2 is a side elevation of Fig. 1 closed.

In carrying out my invention, and referring to Figs. 1 and 2, I make an incomplete link in which one of the sides or a portion of the link is absent. The body of the link $a$ is thus of the shape of a C, and to complete the link I pivot at $b$, to one side of the gap thus provided, a complementary or bridging piece $c$, which comprises rather more than the side absent from the link proper. This bridge-piece $c$ is continued beyond the pivot $b$ to have a curved or sickle end $d$ of the same shape as one of the ends of the body of the link $a$. Its other end forms a tongue or tenon $e$, and both sickle $d$ and tenon $e$ enter corresponding slots $f$ $g$ in the body $a$ of the link.

The bridge $c$ is preferably of the same section as the body $a$, but the sickle $d$ and the tenon $e$ at the ends of $c$ are flattened blades. The tenon $e$ is preferably of a wedge shape, so as to dovetail into its slot $g$. (See Fig. 2.) When closed, the shackle thus has a neat and symmetrical appearance, and to lock the parts in the closed position the tenon $e$ may be snapped into place by means of a bulge $h$ of the metal into the slot $g$, which bulge enters into a recess $l$ in the tenon $e$. The slot $f$ being of considerable length, it will be evident that the jaws $a'$ forming this slot can be sprung apart to a slight extent. This spring of the jaws $a'$ is utilized in a locking device, which will now be described.

I have shown in Fig. 1ª a pin $k$, which is riveted, screwed, or otherwise permanently secured in one of the jaws, slightly projecting into the slot $f$. In the blade $d$ is made a corresponding recess $l$, and when blade $d$ is guided by the jaws $a'$ into the slot $f$ and is forced against pin $k$ the said jaws $a'$ spring slightly more apart and pin $k$ passes into recess $l$. In so doing it may wear a path, as shown, from the edge of $d$ to the recess $l$.

The body of the link $a$ may be made solid or may be formed in layers riveted together.

Having now described my invention, what I claim as such, and desire to secure by Letters Patent, is—

In a shackle, a C-shaped body portion having curved ends, and slots in each of said ends forming forks, said slots being central of said ends and in plane of the shackle, a bridge-piece and tongue-shaped extremities to said bridge-piece passing between said forks and shaped to conform to the curved ends of said body, one of said extremities entering into the depth of the fork at one end of the body portion and being pivoted adjacent to the end of said fork, the said extremity having a recess formed in the flat side thereof, and a locking-pin protruding inwardly from one of the other fork-arms and projecting into the path of the said extremity, said locking-pin being capable of being sprung into the recess in the said tongue-shaped extremity.

In witness whereof I have hereunto set my hand in presence of two witnesses.

FREDERICK JOHN BRIGGS.

Witnesses:
VICTOR F. FEENY,
GEO. W. WHITTON.